United States Patent [19]

Hall

[11] Patent Number: 4,688,843

[45] Date of Patent: Aug. 25, 1987

[54] WHEELCHAIR RESTRAINT SYSTEM FOR VEHICLE

[76] Inventor: Donna R. Hall, 6834 N. 25th Dr., Phoenix, Ariz. 85017

[21] Appl. No.: 836,081

[22] Filed: Mar. 4, 1986

[51] Int. Cl.[4] .......................... B60N 1/02; A61G 5/00

[52] U.S. Cl. ............................... 296/65 R; 248/503.1; 280/242 WC; 280/289 WC; 297/DIG. 4; 410/8; 410/51; 410/105

[58] Field of Search ............... 280/289 WC, 242 WC, 280/290; 248/500, 503, 503.1; 410/104, 105, 115, 51, 52, 53, 54, 7, 8; 296/63, 65 R, 69; 297/DIG. 4, DIG. 10

[56] References Cited

U.S. PATENT DOCUMENTS

| | | | |
|---|---|---|---|
| 2,688,504 | 7/1954 | Parker | 410/105 |
| 4,427,210 | 1/1984 | Wevers | 280/289 WC |
| 4,492,403 | 1/1985 | Blomgren et al. | 280/242 WC X |

FOREIGN PATENT DOCUMENTS

| | | | |
|---|---|---|---|
| 2845870 | 5/1980 | Fed. Rep. of Germany | 410/51 |

*Primary Examiner*—John J. Love
*Assistant Examiner*—Mitchell J. Hill
*Attorney, Agent, or Firm*—Nissle & Leeds

[57] ABSTRACT

Wheelchair restraint apparatus. The apparatus can be utilized to secure a wheelchair in fixed position on the floor of a vehicle without requiring structural modification of the wheelchair or requiring the utilization of tools to attach the restraint apparatus to the wheelchair.

1 Claim, 8 Drawing Figures

WHEELCHAIR RESTRAINT SYSTEM FOR VEHICLE

This invention pertains to apparatus for immoblizing a wheelchair during transport of the wheelchair in a vehicle.

More particularly, the invention pertains to wheelchair restraint apparatus which can be utilized to secure a wheelchair in fixed position on the floor of a vehicle without requiring structural modification of the wheelchair or requiring the utilization of tools to attach the restraint apparatus to the wheelchair.

In another respect, the invention pertains to vehicle wheelchair restraint apparatus which prevents capsizing of a wheelchair and prevents a wheelchair patient from being thrown from a wheelchair during sudden stops and starts of a vehicle in which the wheelchair is being transported.

In a further respect, the invention pertains to a wheelchair restraint apparatus for a vehicle which can be readily stored and transported on the wheelchair and can be secured to a wheelchair by a patient while seated in the wheelchair.

Patients are particularly susceptible to injury when they are in a wheelchair being transported in a van or other vehicle. A principal characteristic of a wheelchair which makes it so useful in hospitals is the ease of movement and ready change of direction afforded by the large rear wheels and small front caster wheels mounted on the wheelchair. These same characteristics makes a wheelchair unstable and susceptible to being tipped over when the wheelchair is in a van and subjected to sudden stops or starts often encountered in modern day automobile traffic. Further, since wheelchairs are not customarily equipped with seat belts, a patient can be thrown from the chair during a sudden deceleration or acceleration of a vehicle. In response to this problem, a variety of wheelchair restraint systems have been developed. See, for example, U.S. Pat. Nos. 2,572,149 to Hind et al., 3,640,571 to Keropian, 4,004,583 to Johnson, 4,073,537 to Hammersburg, 4,177,807 to Ocel et al., 4,427,210 to Wevers, 4,455,046 to Linderoth, and 4,456,086 to Wier et al. Several disadvantages are normally associated with such prior art systems. The systems often require structural modification of existing wheelchairs or require the utilization of hand tools to secure the apparatus to a wheelchair. Further, a wheelchair patient usually is not able, while seated in the wheelchair, to utilize such systems to secure his wheelchair in fixed position in a vehicle. Finally, existing restraint systems often, after being installed in a vehicle, make use of the vehicle for other purposes awkward. Existing systems typically incorporate components which are fixedly secured to and project outwardly from the floor or walls of the vehicle and increase the likelihood a vehicle operator will trip or fall over the components and incur an injury.

Accordingly, it would be highly desirable to provide improved wheelchair restraint apparatus which would permit a patient seated in a wheelchair to secure himself and his wheelchair in fixed position in a vehicle and would also permit him to readily release the restraint apparatus so he could quickly exit the vehicle.

It would also be highly desirable to provide improved wheelchair restraint apparatus which could be attached to a wheelchair without requiring the use of hand tools and which would not interfere with normal utilization of the vehicle when a wheelchair was not being transported therein.

Therefore, it is a principal object of the invention to provide improved apparatus for restraining a wheelchair and its occupant during transport thereof in a vehicle.

Another object of the invention is to provide improved wheelchair restraint apparatus which includes anchor fixtures which can be installed in a vehicle without restricting the maneuverability of an unrestrained wheelchair and without impending normal use of the vehicle for other purposes.

A further object of the instant invention is to provide improved wheelchair restraint apparatus which can be utilized by a patient while seated in a wheelchair to secure the wheelchair in position on the floor of a vehicle and which can be readily disconnected from the wheelchair by the patient to permit quick escape of the wheelchair and patient from the vehicle.

Still another object of the invention is to provide improved wheelchair restraint apparatus which can be used to secure a wheelchair in a vehicle without requiring the use of tools to connect or remove the apparatus to and from the wheelchair.

These and other, further and more specific objects and advantages of the invention will be apparent to those skilled in the art from the following detailed description thereof, taken in conjunction with the drawings, in which.

Briefly, in accordance with my invention, I provide, in combination with a wheelchair carried on the floor of a vehicle and with a patient seated in the wheelchair, improved restraint apparatus for maintaining said wheelchair and patient in generally fixed position on the floor during travel of the vehicle. The wheelchair includes a frame having a front portion and a rear portion; a seat mounted in the frame; an upright seat back mounted in the frame; a pair of handles attached to the frame adjacent the seat backing to permit a medical attendant to push and control the direction of travel of the wheelchair; a pair of opposed ground engaging wheels each mounted on the rear portion of the frame and adapted to permit the patient to grasp and turn the wheels to propel the wheelchair; and, a pair of ground engaging caster wheels each mounted on the front portion of the frame. The restraint apparatus is utilized without requiring structural modification of the wheelchair and includes an elongate strap extending across the chest of the patient; at least three spaced apart anchor segment countersunk in the floor and spaced outwardly away from the wheelchair frame; fastener means operatively associated with each of the anchor segments, the segments and fastener means being adapted to permit each of the fastener means to be fixedly detachably secured to its anchor segment at a plurality of points therealong; and, at least three tensioned strap means each having a lower end, an upper end, and buckle means intermediate said upper and lower ends. The elongate chest strap has a pair of ends adapted to be removably fixedly slid onto the handles of the wheelchair and has buckle means intermediate the ends of the elongate strap for manually tightening and loosening the strap. Each of the three anchor segments has an uppermost surface flush with the floor. The lower end of each of the strap means is connected to one of the fastener means. The upper end of each of the strap means is fixedly detachably secured around the frame. The buckle means for each of the strap means permits the strap means to be manually tightened and loosened. The upper ends of two of the strap means is secured to one of the front and rear portions of the wheelchair. The upper end of the third remaining strap means is secured to the other of the front and rear portions of the wheelchair. Each of the tensioned strap means produces a downwardly directed force component $F_Z$, at least one outwardly directed force component $F_X$ or $F_Y$, and at least one force component $F_X$ or $F_Y$ directed outwardly from the frame and opposed to a force component $F_X$ or $F_Y$ of each of the other two tensioned strap means.

Figure 1:
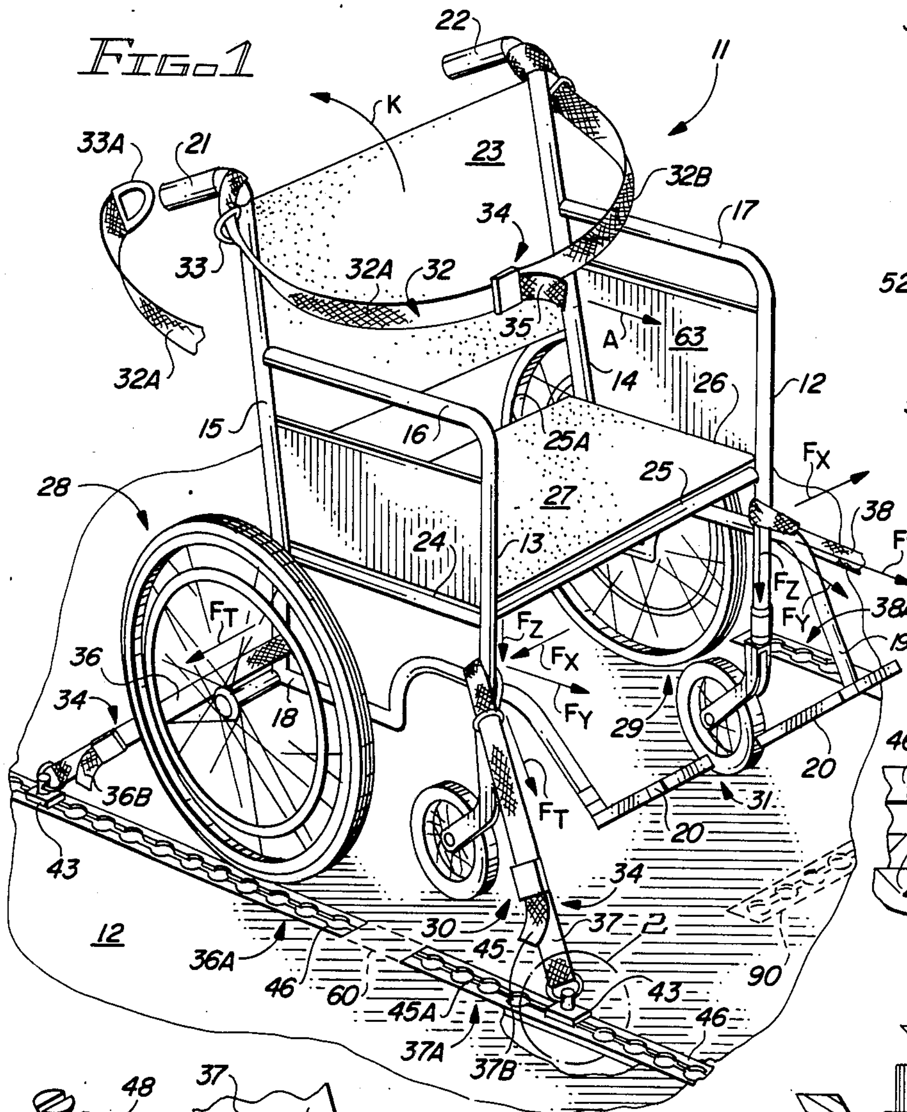
FIG. 1 is a perspective view illustrating a wheelchair secured in a vehicle by restraint apparatus constructed in accordance with principles of the invention.
Figure 3:
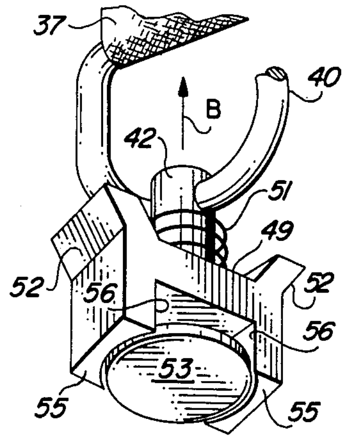
FIG. 3 is a perspective view of a portion of the apparatus of FIG. 2.

Turning now to the drawings, which depict the presently preferred embodiments and best mode of the invention for the purpose of illustrating the practice thereof and not by way of limitation of the scope of the invention, and in which like reference characters represent corresponding elements throughout the several views, FIGS. 1–7 illustrate wheelchair restraint apparatus constructed in accordance with the principles of the invention and utilized to maintain a wheelchair, generally indicated by reference character 11, in position on the floor 12 of a van or other vehicle utilized to transport the wheelchair. Wheelchair 11 includes vertical tubular leg members 12–15 and arms 16 and 17 interconnecting leg pairs 13, 15 and 12, 14, respectively. Horizontally oriented brace members 18 and 19 also interconnect leg pairs 13, 15 and 12, 14 and support the footrests 20. Handles 21, 22 are attached to the upper ends of legs 14, 15 adjacent seat backing 23. Horizontal braces 24–26 support seat 27. Arm 16, leg 15, brace 24 and horizontal member 18 define one side of wheelchair 11. Arm 17, brace 26, legs 12 and 14, and horizontal member 19 define the other side of wheelchair 11. The front portion of wheelchair 11 includes legs 12 and 13, brace 25, footrests 20 and the forward portions of horizontal frame arms 16 and 17, braces 24 and 26, and members 18 and 19. The rear portion of wheelchair 11 includes seat backing 23, handles 21 and 22, legs 14 and 15, and the rear halves of arms 16 and 17, braces 24 and 26 and members 18 and 19. Ground engaging wheels 28, 29 mounted on the rear of wheelchair 11 can be manually turned by a patient seated in wheelchair 11 to propel the wheelchair. Ground engaging caster wheels 30, 31 mounted on the front of wheelchair 11 turn to permit the direction of travel of the wheelchair to be altered. Elongate strap 32 extends across the chest of a patient seated in wheelchair 11 and is detachably fixedly slidably secured over handles 21, 22. Each end of chest strap 32 is attached to an eyelet 33 and strap 32 passes back through eyelet 33 such that strap 32 encircles each handle 21. As shown in FIG. 1, each chest strap half 32A can be attached to an eyelet 33A which is sized to simply slide over handle 21 or 22. Seat belt buckle unit 34 is used to manually tension strap 32 across the chest of a patient by pulling on strap end 35 in conventional fashion in the direction of arrow A. Strap 32 is released from across the chest of a patient by simply pulling up on the tongue of seat belt buckle unit 34 in conventional fashion. Buckle 34 unit is of the design commonly found on seat belts in commercial passenger airlines and in automobiles and consequently can, in the manner just described, be quickly manually realeased or tightened by a patient seated in wheelchair 11.

Figure 4:
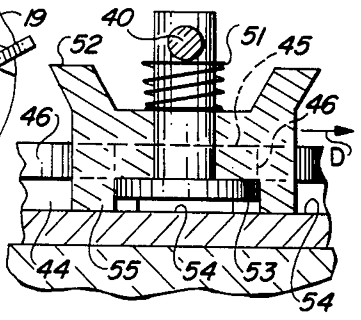
FIG. 4 is a partial section view of the apparatus of FIG. 2 taken along section line 4—4 thereof and illustrating the mode of operation thereof.
Figure 2:
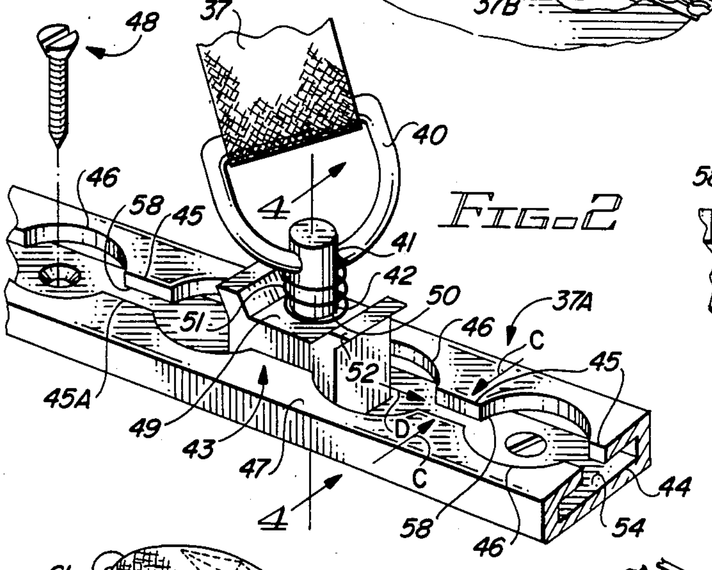
FIG. 2 is an enlarged perspective view of a portion of the apparatus of FIG. 1 illustrating further construction details thereof.
Figure 5:
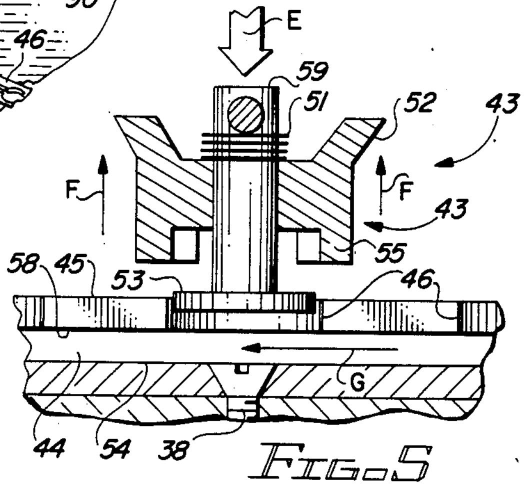
FIG. 5 is a front view of the apparatus of FIG. 4 further illustrating the mode of operation thereof.

Tensioned anchor straps 36–38 and 39 (not visible) hold wheelchair 11 securely in place on floor 12 and span the distance between the frame of wheelchair 11 and fastener anchor segments 36A–38A and 39A (not visible) countersunk in vehicle floor 12. The upper end of strap 39 (not visible) encircles leg 14 while the lower end of strap 39 is secured to anchor segment 39A. Opposing anchor segments 37A and 38A are generally parallel and are positioned slightly away from and outside of the area of floor 12 over and on which wheelchair 11 is situated. Anchor segments 36A and 39A (not visible) are also opposed, generally parallel and positioned slightly away from an outside of the area of floor 12 over and on which wheelchair 11 is situated. Each strap 36–39 has a seat belt buckle unit 34 positioned on the strap intermediate the ends of the strap. As shown in FIG. 2, the lower end of strap 37 is secured to eyelet 40 passing through aperture 41 formed through pin 42 of fastener unit 43. Fastener unit 43 detachably fixedly engages anchor segment 37A. Segment 37A includes longitudinal rectangular slot 44 formed therethrough. Longitudinal slot 44 extends the length of segment 37A. Opposed tooth pairs 45 and 45A define another longitudinal slot spanning the length of anchor segment 37A and interconnecting circular apertures 46 formed through the uppermost planar surface 47 of segment 37A. The shortest distance across the space between each opposed tooth pair 45, 45A is indicated by arrows C in FIG. 2. Surface 47 is flush with and lies in the same horizontal plane as floor 12. Screws 38 secure strip 37A to floor 12. Fastener unit 38 is adapted to be detachably fixedly attached to strip 37A at a plurality of points therealong in the manner illustrated in FIGS. 3–5. Unit 43 includes pin shaft 42 slidably extending through aperture 50 thereof. Compressed spring 51 acts against upper surface 49 and eyelet 40 to bias pin shaft 42 and circular pin head 53 upwardly in the direction of arrow B. Unit 43 includes finger grasps or wings 52 and feet 55 which normally rest on floor 54 of slot 44 of segment 37A. Inner canted surfaces 56 are shaped and dimensioned and spaced apart to receive a tooth 45 and 45A in the manner illustrated in FIGS. 2 and 4. In FIGS. 2 and 4, the action of compressed spring 51 against eyelet 40 and surface 49 upwardly biases head 53 against lower surfaces 58 of an opposed tooth pair 45, 45A. Spring 51 actually functions as a "double action" spring. When head 53 contacts lower surfaces 58 of an opposed tooth pair 45 and 45A, spring 51 acts against upper surface 49 to force feet 55 against floor 54 of segment 37A. When fastener unit 43 engages segment 37A in the manner illustrated in FIGS. 2 and 4, unit 43 cannot be upwardly displaced from segment 37A in the direction of arrow B (FIG. 3) or displaced along segment 37A in the direction of arrow D (FIGS. 2 and 4). Fastener unit 43 is disengaged from segment 37A by placing the index and second fingers of a hand beneath wings 52 and placing the thumb of the hand on top 59 of pin 42. The thumb is pressed downwardly in the direction of arrow E. The fingers are pulled upwardly in the directions of arrows F (FIG. 5). This forces pin head 53 against floor 54 and raises feet 55 upwardly away from floor 54 in the direction of arrows F to a position above surface 47. After feet 55 are above surface 47, unit 43 can be slidably displaced along segment 37A and head 53 displaced along slot 44 in the direction of arrow D (FIGS. 2 and 4) until head 53 is immediately beneath an aperture 46. Since the diameter of aperture 46 is greater than that of pin head 53, head 53 and unit 43 can be lifted upwardly away from segment 37A in the direction of arrows F in the manner indicated in FIG. 5. Once unit 43 is separated from segment 37A, the pressure applied to wings 52 and surface 59 by the fingers and thumb of a hand can be realeased. Unit 43 is reinstalled on segment 37A utilizing a procedure generally reverse that just described for removing unit 43. For example, during reinstallation unit 43 is slidably displaced along segment 37A and head 53 slidably moves along slot 44 in the direction of arrow G. Once head 53 is positioned beneath the lower surfaces 58 of a tooth pair 45, 45A, the finger and thumb pressure on wings 52 and pin 42 is released and unit 43 assumes a position equivalent to that shown in FIGS. 2 and 4. As would be appreciated by those of skill in the art, unit 43 can be positioned along segment 37A with legs 55 straddling any opposed tooth pair 45, 45A therealong.

In the drawings segments 36A–39A are identical in shape and dimension. Segments 36A and 37A could, as indicated by dashed lines 60, comprise portions of a unitary piece of countersunk anchor material.

Figure 6:
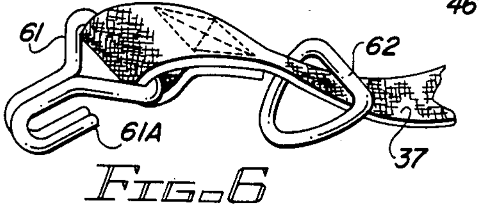
FIG. 6 is a partial perspective view of the apparatus of FIG. 1.
Figure 7:
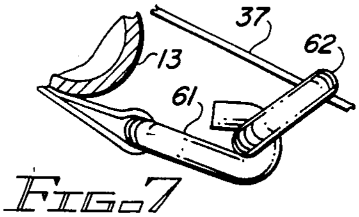
FIG. 7 is a top view of the apparatus of FIG. 6 illustrating the mode of operation thereof; and, FIG. 8 is a top view of the apparatus of FIG. 7 with the position of the hook inverted.

As illustrated in FIGS. 6 and 7, the upper end of each strap 36–39 is connected to a hook 61 and includes an eyelet 62 slidably carried thereon. Hook 61 and eyelet 62 permit the upper end of each strap 36-39 to detachably fixedly encircle any of the various differently sized components of the frame of wheelchair 11.

In use, segments 36A–39A are countersunk in the floor 12 of a vehicle such that uppermost surface 47 of each segement 36A–39A is flush with floor 12. Straps 32, 36–39 are carried in a storage container (not visible) secured to the outside of side panel 63 of wheelchair 11. The container can, if desired, be mounted inside the vehicle which will transport the wheelchair 11. Fastener units 43 are also carried in the container with straps 36–39 and are secured to the end of each strap 36–39 in the manner illustrated in FIGS. 2 and 3. The upper end of each strap 36–39 includes a hook 61 and eyelet 62 as depicted in FIGS. 6 and 7. A patient seated in wheelchair 11 removes straps 32, 36–39 from the storage container, and manually secures the fastener unit 43 on the end of each straps 36–39 to the particular anchor segment 36A–39A operatively associated with each strap. The hook 61 on the end of each strap 36–39 is manually looped around a leg 12–15 of the wheelchair 11 and clipped onto its associated eyelet 62 as shown in FIG. 7. The free end 36B–39B of each strap 36–39 extending through its seat belt buckle unit 34 is manually drawn though buckle unit 34 by the patient to tension straps 36–39. Ends 38B and 39B are not visible in the drawings. The patient can also operate conventional seat belt buckle unit 34 to separate strap 32 into halves 32A and 32B. Strap half 32A carries the seat belt buckle clip which is inserted into the seat belt buckle carried on strap half 32B. If each strap half 32A, 32B is provided with an eyelet 33A, then the patient slides each eyelet 33A over one of handles 21, 22. If each half 32A, 32B is provided with an eyelet 33—loop arrangment of FIG. 1, then each eyelet 33—loop is placed over one of handles 21, 22. After one end of each half 32A is placed around a handle 21 or 22, buckle unit 34 is snapped together and free end 35 is pulled by the patient outwardly in the direction of arm A to tension strap 32 across his chest. A seated patient can quickly release wheelchair 11 from the tiedown position shown in FIG. 1 by simply manually operating each conventional seat belt buckle unit 34 on straps 36–39 to separate each strap 36–39 into two separate halves, the upper half being connected to wheelchair 11 by a hook 61-eyelet 62 and the lower half being connected to an anchor segment 36A–39A by a fastener unit 43. Seat belt buckle units 34 are positioned on straps 36–39 so a patient seated in wheelchair 11 can readily reach buckle units 34 to release tensioned straps 36–39. Anchor segments 36A–39A are positioned in floor 12, wheelchair 11 is positioned intermediate segments 36A–39A, and fastener units 43 are secured to segments 36A–39A such that each tensioned strap 36–39 generates an outward force $F_T$ on wheelchair 11. Force $F_T$ has components $F_X$, $F_Y$ and $F_Z$. Force components $F_X$ and $F_Y$ are perpendicular to one another and lie in an imaginary horizontal plane generally parallel to floor 12. Force component $F_Z$ is generally perpendicular to floor 12 and to force components $F_X$ and $F_Y$. The $F_X$ components of forces $F_T$ for straps 38 and 39 (not visible) are opposed to the $F_X$ components for straps 36 and 37. The $F_Y$ components of forces $F_T$ for straps 37 and 38 are opposed to the $F_Y$ of forces $F_T$ for straps 36 and 39 (not visible). If desired, only three straps need be utilized to anchor wheelchair 11. Two of the three straps would comprise one of strap pairs 36, 37; 37, 38; 38, 39; and 39, 36. Each strap pair would generate an $F_X$ or $F_Y$ component acting in the same direction. The third strap preferably would only generate either a $F_X$ or $F_Y$ component opposed to the $F_X$ or $F_Y$ components for the strap pair, and would lie in an imaginary vertical plane generally bisecting the distance between the strap pair. For instance, if in FIG. 1 straps 37 and 38 were removed and only tensioned strap pair 36, 39 remained, then the third strap would preferably be connected to wheelchair 11 at the midpoint of brace 25 and would have a fastener unit 43 attached to its lower end and affixed to an anchor segment 90. This third strap would generate a $F_T$ having a $F_Y$ component and generally not having a $F_X$ component. The $F_Y$ component of the third strap would oppose and be equivalent to the combined $F_Y$ components of straps 36 and 39.

To insure the stability of wheelchair 11 during sudden stops or starts of a vehicle it is important that force components $F_Z$ be generated by straps 36–39 and that the sum of force components $F_X$ of straps 36–39 be zero, and that the sum of force components $F_Y$ of straps 36–39 be zero. The utilization of only two straps 36–39 is not sufficient to safely secure wheelchair 11. At least three straps must be utilized.

The above described restraint apparatus of the invention can be utilized to secure a wheelchair in a vehicle without requiring any structural modificaton of the wheelchair, and can be utilized by a patient seated in the wheelchair when the patient has the use of his hands and arms.

As earlier noted, three tensioned anchor straps can be utilized to secure wheelchair 11 in place on floor 12. Since the center of gravity of wheelchair 11 is located to the rear of the chair, chair 11 tends to be more readily tipped over rearwardly in the direction of arrow K in FIG. 1. Consequently, when three tensioned anchor straps are utilized, it is preferred that the three straps include strap pair 37, 38 attached to the front of the wheelchair and include a third strap 90 (not shown) attached to the center of rear cross bar 25A which supports seat 27 and spans the distance between frame members 14, 15. Tensioned strap 90 would have $F_Y$ and $F_Z$ force components but generally would not include an $F_X$ force component.

Figure 8:
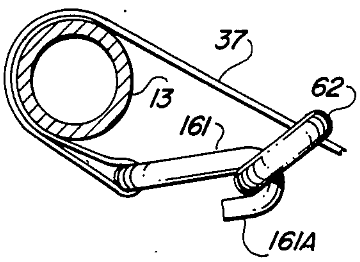

In FIGS. 6 and 7 tip 61A of hook 61 turns inwardly. When hook 61 is passed around a structural member 13 as shown in FIG. 7, the hook can, when a vehicle transporting wheelchair 11 passes over a bump, jerk free of eyelet 62. It is therefore important that the tip of hook 61 open outwardly in the manner illustrated by tip 161A of hook 161 in FIG. 8. When hook 161 engages eyelet 62 in the manner illustrated in FIG. 8, hook 161 generally remains engaged with eyelet 62 even when the vehicle transporting wheelchair 11 passes over a bump or abruptly starts or stops.

Tensioned anchor straps 36–39 must be removably attached to the frame of wheelchair 11 at points beneath frame members 24–26 and 25A and seat 27.

Having described the invention in such terms as to enable those skilled in the art to which it pertains to understand and practice it, and having described the presently preferred embodiments and best mode thereof, I claim:

1. In combination with a wheelchair carried on the floor of a vehicle and with a patient seated in the wheelchair, restraint apparatus for maintaining said wheelchair and patient in generally fixed position on said floor during travel of said vehicle, said wheelchair including a frame having a front portion and a rear portion, a seat mounted in the frame, an upright seat backing mounted in the frame, a pair of handles attached to the frame adjacent the seat backing to permit a medical attendant to push and control the direction of travel of said wheelchair, a pair of opposed ground engaging wheels each mounted on the rear portion of said frame and adapted to permit said patient to grasp and turn said wheels to propel said wheelchair, and a pair of ground engaging caster wheels each mounted on the front portion of said frame, said restraint apparatus being utilized without requiring structural modification of said wheelchair and including (a) an elongate strap extending across the chest of the patient, said strap having a pair of ends adapted to be removably fixedly slid on to said handles of said wheelchair and having buckle means intermediate said ends for manually tightening and loosening said strap;

(b) at least three spaced apart anchor segments countersunk in said floor and spaced outwardly away from said wheelchair frame, each of said segments having an uppermost surface flush with said floor;

(c) fastener means operatively associated with each of said anchor segments, said segments and fastener means being adapted to permit each of said fastener means to be fixedly detachably secured to its respective anchor segment at a plurality of points therealong;

(d) at least three tensioned strap means each having a lower end, an upper end, and buckle means intermediate said upper and lower ends, (i) said lower end of each of said strap means being connected to one of said fastener means, (ii) said upper end of each of said strap means being fixedly detachably secured around said frame, (iii) said buckle means readily permitting each of said strap means to be manually tightened and loosened, (iv) the upper end of two of said strap means being secured to one of said front and rear portions of said wheelchair, the upper end of the third remaining strap means being secured to the other of said front and rear portions of said wheelchair, each of said tensioned strap means producing a downwardly directed force component $F_Z$, at least one outwardly directed force component $F_X$ or $F_Y$, and at least one force component $F_X$ or $F_Y$ directed outwardly from said frame and opposed to a force component $F_X$ or $F_Y$ of each of the other two tensioned strap means.

* * * * *